United States Patent [19]

Besik

[11] Patent Number: 4,982,575
[45] Date of Patent: Jan. 8, 1991

[54] APPARATUS AND A METHOD FOR ULTRA HIGH ENERGY EFFICIENT DEHUMIDIFICATION AND COOLING OF AIR

[76] Inventor: Ferdinand K. Besik, 2562 Oshkin Court, Mississauga, Ontario, Canada, L5N 3Z3

[21] Appl. No.: 232,854

[22] Filed: Aug. 16, 1988

Related U.S. Application Data

[63] Continuation-in-part of Ser. No. 152,808, Feb. 5, 1988, Pat. No. 4,952,283, and Ser. No. 232,856, Aug. 16, 1988.

[51] Int. Cl.[5] .................. F25B 17/00; F25B 23/00; B01D 53/04
[52] U.S. Cl. ...................................... 62/271; 55/208; 55/387; 165/4; 165/7
[58] Field of Search .............. 62/271; 165/4, 7; 55/208, 387

[56] References Cited

U.S. PATENT DOCUMENTS

| | | | |
|---|---|---|---|
| 2,811,223 | 10/1957 | Newton | 62/271 |
| 4,219,341 | 8/1980 | Hussmann | 62/271 |
| 4,227,375 | 10/1980 | Tompkins et al. | 62/271 |
| 4,380,910 | 4/1983 | Hood et al. | 62/271 |
| 4,467,785 | 8/1984 | Langford et al. | 62/271 |
| 4,711,097 | 12/1987 | Besik | 62/271 |
| 4,711,097 | 12/1987 | Besik | 62/271 |

Primary Examiner—Albert W. Davis, Jr.

[57] ABSTRACT

A compact apparatus for dehumidification and cooling of air for use in air conditioning of buildings comprises a container with stationary matrices, air fans, water pumps and a solid state processor, with the stationary matrices providing a periodic flow type energy efficient transfer of heat, dehumidification and evaporative cooling of air. Dehumidification of air and reactivation of the spent desiccant is achieved by the energy of the outdoor air and results in a cooling energy efficiency ratio of the apparatus (EER) 10 to 20 times larger than that of the most energy efficient vapor compression systems. Only a small amount of electric power is used to operate air fans providing alternate, periodic and countercurrent flow of the primary and the secondary air streams through the apparatus, and to operate water pumps used in evaporative cooling of the air. Operation of the apparatus is automatic and is controlled by a solid state processor. The apparatus intended for use in air conditioning and ventilation of buildings can be easily adapted for use in numerous industrial dehumidifying and cooling operations.

19 Claims, 2 Drawing Sheets

APPARATUS AND A METHOD FOR ULTRA HIGH ENERGY EFFICIENT DEHUMIDIFICATION AND COOLING OF AIR

CROSS-REFERENCE TO RELATED APPLICATION

This application is a continuation-in-part of my earlier application Ser. No. 152,080 filed Feb. 5, 1988, now U.S. Pat. No. 4,952,283 granted Aug. 28, 1990 and my copending application Ser. No. 232,856 filed Aug. 16, 1988 entitled "Apparatus for ultra high energy efficient heating, cooling and dehumidifying of air".

FIELD OF INVENTION

The present invention relates to an apparatus and a method for a periodic flow type dehumidification and cooling of air for use in ventilation and air conditioning of buildings and in industrial dehumidification and process cooling.

BACKGROUND TO THE INVENTION

Regardless of climatic conditions, commercial, institutional and industrial buildings are air conditioned due to the steady escalation of internal heat gains. Depending on the type, building occupancy and climate, the cost of air conditioning systems vary from 10 to 30 percent of total construction costs with the cooling plant accounting for more than half of the total air conditioning system cost.

In the various industrial sectors many process and manufacturing operations involve process cooling to maintain the plant performance, with the required cooling system representing a significant portion of the overall plant capital, amortization and operating costs Combination of unit operations used in cooling systems may include heat exchange, indirect and direct evaporative cooling, mechanical vapour compression refrigeration, absorption refrigeration and adsorption or absorption dehumidification. Alternative combinations of these operations are being sought by users seeking lower operating costs and by utilities facing increasing demand for electric power used to operate these facilities.

One prior art system recently developed by Cargo Caire Engineering Corp. (Gas Research Institute Digest, Vol.8. No. 4., Winter 1985/86, p.30) uses a combination of adsorption dehumidification, vapour compression refrigeration, evaporation and heat exchange operations to dehumidify and cool the outdoor air for use in air conditioning of space. In the adsorption dehumidification stage of the treatment the prior art system uses a rotating desiccant wheel concept with a waste heat recovery heat exchanger to improve the efficiency of the adsorption step and uses natural gas as fuel in preheating the air used to reactivate spent desiccant.

Another prior art system described by U.S. Pat. No. 4,222,244 issued to G. Meckler, uses a combination of desiccant rotating wheel dehumidification, vapor compression refrigeration and heat exchange operations to cool air for air conditioning and uses waste heat energy and solar energy to reactivate spent desiccant.

The engineering principles of adsorption are well known and documented and the operation is effectively used in many applications involving recovery of solvents, separation of petrochemicals separation of oxygen and nitrogen from air, removing of toxic gases from gas streams and removing of moisture from liquid and gaseous products. Similarly, principles of evaporative cooling are well known and the operation is broadly used including air conditioning of buildings.

Adsorption systems used in dehumidification of air may use an adsorbent-desiccant structure which may be a fixed bed, a moving bed, or a rotating bed which may be a disc, drum or wheel, and containing a suitable adsorbent-desiccant or which structure may be filled with an inert porous solid material impregnated with liquid absorbent such as lithium chloride.

The fixed bed systems may use a single, two, or more fixed beds of granular sorbent, and are provided with a quick closing valve arrangement permitting the cycling of the treated air and the regenerant streams between individual beds.

The rotating systems are equipped with a suitable rotating mechanism to rotate the adsorbent bed between the processed air and regenerant streams which are separated from each other by seals to prevent mixing.

All systems are equipped with an adsorbent reactivation subsystem. The reactivation of spent adsorbent may be either by the heat energy of the regenerant, by evacuation of the adsorbent bed, by heating of the bed, by an inert dry gas or by some combination thereof.

It is well known that the amount of moisture removed from air by adsorption depends on properties of the adsorbent, on the temperature of adsorbent during adsorption, on the temperature, pressure and humidity of the treated air, and on the contact time of the treated air with the adsorbent.

It is also known that the effectiveness of reactivation of spent adsorbent depends on the rate and magnitude of change of the moisture-adsorbent equilibrium, which depends on the reactivation temperature, pressure, vapour pressure of moisture in regenerant and heat capacity of adsorbent.

It is also known that the released adsorption heat and the residual heat retained by adsorbent from the preceded desorption period cause an increase in the temperature of the adsorbent bed and of the treated air and inhibit the effectiveness of dehumidification.

It is also known that adiabatic cooling of dry air in direct contact with water reduces the treated air temperature and that the resulting air-water temperature depends on the dry bulb temperature and initial humidity of the air and on the effectiveness of the evaporator. And it is also known that the quality of the outdoor air depends on weather conditions and location.

While all the above process principles are known and well documented, it remains, that the current art desiccant cooling systems can not produce the required low temperatures of the treated air without a considerable amount of useful energy used up in the reactivation of the spent desiccant.

It is therefore the object of the present invention to provide an apparatus and a method for cooling of air for use in air conditioning of buildings without the need for the useful energy required by the prior art for the reactivation of the spent desiccant.

SUMMARY OF INVENTION

The apparatus of the present invention as described in detail in the preferred embodiments is providing means of particular construction and particular methods for dehumidification and cooling of air for use in air conditioning of buildings including indirect evaporative cooling of air, adiabatic or alternately an isothermic sorption dehumidification of air, reactivation of desiccant, indirect and or direct evaporative cooling of the dehumidified air and ventilation of buildings.

In accordance with embodiments of the present invention it has now been found that the required cooling of air can be achieved in a treatment including periodic flow type desiccant dehumidification followed by evaporative cooling without the need for mechanical vapour compression or absorption refrigeration steps and without the need for the additional source of energy for the reactivation of the spent desiccant.

It has been found that the reactivation of spent desiccant can be achieved by the outdoor air if the preceded sorption dehumidification step of the treatment has been carried out with air that has been precooled before passing through the bed of desiccant, or alternately with the precooled air and simultaneously cooled desiccant.

By utilizing the energy of the outdoor air in both the adsorption and desorption steps of the treatment, the cooling energy efficiency ratio (EER) of the apparatus of this invention has been increased to values that are several times larger than that of the most energy efficient vapour compression refrigeration systems.

The required precooling of the air is achieved in a compact single stage or a two stage periodic flow type indirect evaporative cooler of the present invention including stationary matrix type heat exchangers, humidifier, air fans and a solid state processor.

Alternately, the two stage indirect evaporative cooler may in addition include an air to liquid periodic flow type heat exchanger to provide cooling water for simultaneous cooling of the bed of the desiccant.

A periodic flow type indirect and or direct evaporative cooler is added to provide the final cooling of the dehumidified air.

While the apparatus of the present invention is being described as intended for use in cooling and ventilation of buildings it is equally suitable for use in numerous industrial process dehumidification and cooling operations.

DETAIL DESCRIPTION OF PREFERRED EMBODYMENTS

Since the theory of adsorption, indirect and direct vaporative cooling of air, and the periodic flow type transfer of heat and moisture in matrix type devices is well documented, the following description of the invention is limited to the basic features of the invented apparatus and the used methods.

Figure 1:
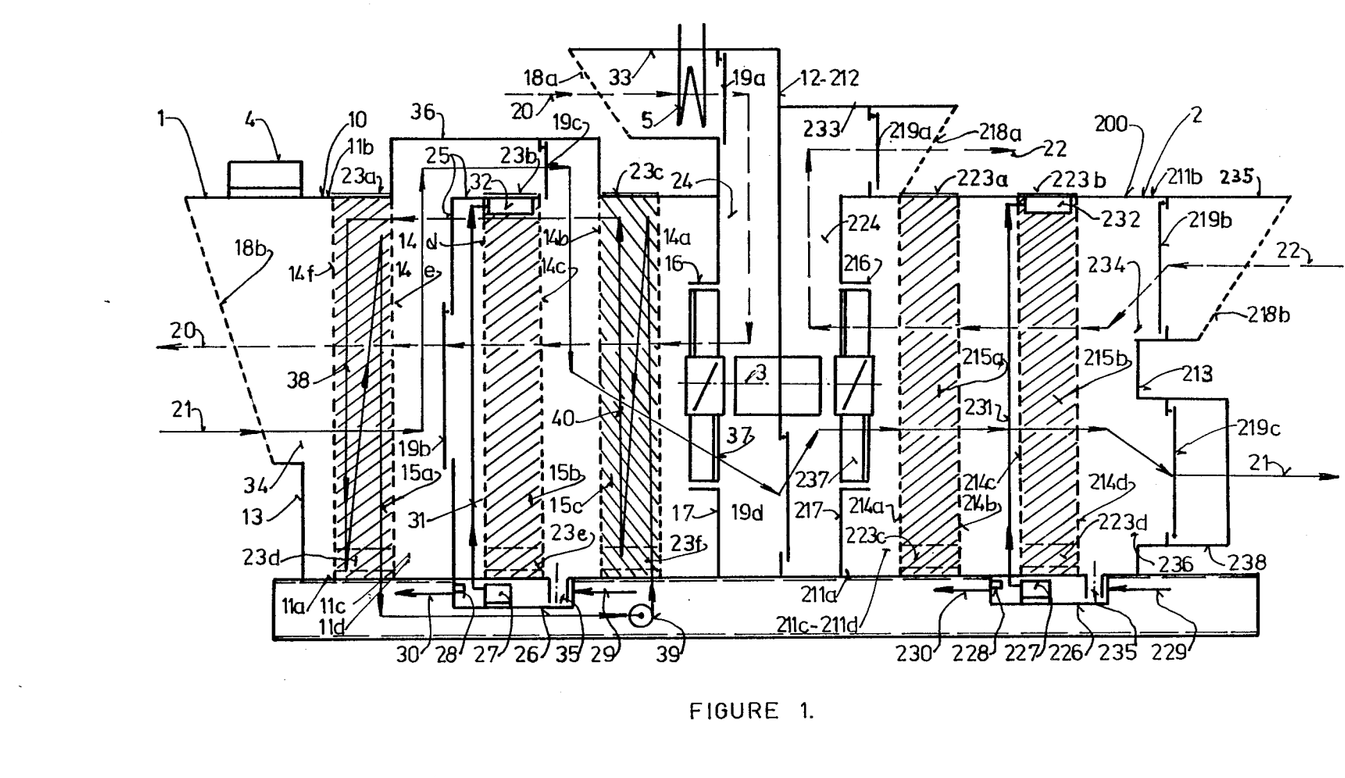
FIG. 1 is a schematic of one preferred embodiment of the apparatus of the present invention intended for use in cooling and ventilation of buildings.

As schematically illustrated in FIG. 1, the invented apparatus intended for use in cooling and ventilation of buildings includes a desiccant dehumidifier 1, an indirect-direct evaporative cooler 2, a 4-way axial type air fan 3, and a solid state processor 4.

The dehumidifier 1 includes a matrix container 10 that is generally rectangular, with four side walls 11a–11d, a front wall 12 and a rear wall 13. The front will 12 is a common wall (212) separating the dehumidifier 1 from the indirect-direct evaporative cooler 2. A partition 17 with an air fan orifice 16 and the front wall 12 with side walls 11a–11d form a chamber 24 provided for intake of the secondary air 20 and for discharge of the primary air 21 from the air fan orifice 16. Chamber 24 has an intake 33 provided with screen 18a and a gravity back draft damper 19a for intake of the secondary air 20 from outdoors and a gravity back draft damper 19d for discharge of the primary air from the dehumidifier 1 into the indirect-direct evaporative cooler 2.

The side walls have flanged openings 23a–23f for replacement of the matrix materials.

Within the matrix container 10 there are screens 14a–14f provided for retaining three matrix beds 15a–15c, partition 25 with back draft damper 19b separating the matrix container 10 into first chamber including matrix beds 15b, 15c, and a second chamber including matrix 15a, and a bypass duct 36 with damper 19c interconnecting the first and the second chambers.

Matrix bed 15a may include heat absorbing solids such as ceramic or brick pieces, crushed stone, fired pellets of minerals, conventional ceramic, metal, plastic or wood packings of different shapes, corrugated metal or plastic sheets, expanded metal or plastic, plastic or metal wire, cloth or fibers, finned tubes filled with water or liquid, with solid materials being mixed or separated by screens in parallel payers.

Matrix bed 15a in addition may also include a coil type heat exchanger 38 including a water pump 39, with the water pump operating only during the sorption period and with coil 38 including cooling water functioning during the desorption period as a heat absorbing material of bed 15a.

Matrix bed 15b includes conventional materials used in air washers and humidifiers. The water container 26, water pump 27, water level controller 28 water line 31, water distribution channel 32, make up water line 29 and water sink 30 are provided for washing, humidifying and adiabatic cooling of the air passing through bed 15b. The water container 26 is in communication with the container 10 via drain pipe 35 provided for return of the recirculated water used in bed 15b.

Matrix bed 15c includes a suitable solid desiccant, or it may include a granular solid material coated or impregnated with a suitable absorbent such as lithium chloride. In addition it may also include a coil type heat exchanger 40 interconnected with heat exchanger 38 with pump 39 recirculating during the sorption period cooling water between coils 38, 40 for cooling of the desiccant.

The type of the matrix materials or the preferred particle size or shape of solid materials used in beds 15a–15c is dictated by factors such as heat and or moisture sorption properties, required effectiveness, operating cycle time, desired physical shape and or weight of packed beds, cost of the matrix material, and the desirable overall pressure drop across the dehumidifier.

The rear wall 13 has opening 34 with screen 18b for discharge of the secondary air and for intake of the primary air from outdoors into dehumidifier 1.

Partition 25 and bypass duct 36 with back draft dampers 19b, 19c are provided for passage of the secondary air 20 under the influence of the air fan 3 into and through matrix bed 15c, 15b, damper 19b, matrix bed 15a and out of the dehumidifier 1 via opening 34 and screen 18b, and for intake of the primary air 21 from outdoors into and through matrix bed 15a, bypass duct 36, damper 19c, matrix bed 15c, fan 3 into chamber 24 and via damper 19d out of dehumidifier 1 into the evaporative cooler 2.

An auxiliary heater 5 located in intake duct 33 is provided for heating of the secondary air in situations when the relative humidity of the outdoor air is too high and temperature too low to achieve the desired dehumidification of the primary air and reactivation of the desiccant by the outdoor air.

The heater may be a direct gas fired heater, or it may be a built in electric heater, or a tubular heat exchanger with a hot fluid flowing through it, with the hot fluid being a liquid or a gas, with the heater preferably operating periodically and at the end of the desorption period.

The 4-way tube axial air fan 3 provides the required alternate, periodic and countercurrent flow of the two air streams through both the dehumidifier 1 and the evaporative cooler 2.

The 4-way tube axial air fan 3 includes two orifices 16, 216, and two axial fixed blade propellers driven by a single direct drive plug reversing electric motor permitting continuous instant reversing of the rotation of the two air propellers, and thus instant switching of the flow of the two air streams through the dehumidifier 1 and the evaporative cooler 2. The duration time of the switching period is very short, about 1 sec. for a tested ⅛ Hp motor, and the duration time of the operating cycle therefore can be as short as 20 sec.

Alternately, the rotation of the two axial fixed blade propellers may be by a belt driven plug-reversing electric motor, or by a reversible electric drive provided with brakes, or by a unidirectional drive in combination with electric or mechanical clutches.

Alternately, the 4-way tube axial air fan 3 may include two axial air propellers with adjustable blades driven by a unidirectional drive with the propeller blades changing their position in the middle of the operating cycle under the influence of the processor 4.

Alternately, the 4-way tube axial air fan may be replaced by two 2-way tube axial air fans or by four alternately operating axial or radial type air fans.

The evaporative cooler 2 includes a matrix container 200 that is generally rectangular with four side walls 211a–211d, a front wall 212, and a rear wall 213. The front wall 212 is a common wall (12) separating cooler 2 from dehumidifier 1.

A partition 217 with the air fan orifice 216 and the front wall 212 with side walls 211a–211d form a chamber 224 provided for intake of the dehumidified primary air 21 from dehumidifier 1 and intake of the secondary air 22 from the air fan orifice 216 and discharge of the secondary air 22 from the evaporative cooler 2 via duct 233, damper 219a and screen 218a to outdoors.

The side walls have flanged openings 223a–223d for replacement of the matrix materials.

Within the matrix container 200 there are screens 214a–211d separating the container into consecutive chambers provided for two matrix beds 215a, 215b. Matrix bed 215a includes same heat absorbing solids as those of bed 15a of the dehumidifier 1, and matrix bed 215b same as those of bed 15b of humidifier 1 including the water pump 227, water container 226, water level controller 228, water line 231, water distribution channel 232, make up water line 229 and water sink 230 and drain pipe 235.

The rear wall 213 has an opening 234 provided with a duct 235, back draft damper 219b and screen 218b for intake of the secondary air 22 and an opening 236 with duct 238 and damper 219c for discharge of the adiabatically cooled primary air 21 out of the apparatus.

The continuous alternate periodic operation of the 4-way tube axial air fan 3 and the continuous operation of the water pumps 27, 227 is maintained by the processor 4 which automatically switches the rotation of the air fan propellers in the middle of the operating cycle. The duration time of the operating cycle is also controlled by the processor 4.

The processor 4 includes a variable timer and a series of relays interconnected with temperature and humidity sensors, 4-way fan 3, water pumps 27, 39, 227 and the auxiliary heater 5. The actual circuits of the processor 4 and the associated relays are not given in detail inasmuch as any number of different circuits can perform the same function.

The described apparatus of FIG. 1 operates in an operating cycle including two operating periods, i.e. a sorption period followed by a desorption period maintained by the processor 4 maintaining the operation of the 4-way air fan 3 in a reversing mode and with the water pumps operating continuously, with the heat and mass transfer operations occuring in the apparatus as follows During the sorption period:

The 4-way air fan 3 draws the warm primary air 21 from outdoors through screen 18b and opening 34 into the container 10 of the dehumidifier 1, then through bed of heat absorbing material 15a, duct 36, damper 19c, bed of desiccant 15c, orifice 16, then it is forced by propeller 37 through chamber 24, then drawn by propeller 237 through damper 19d into chamber 224 of the evaporative cooler 2, then through orifice 216, then forced by propeller 237 through matrix beds 215a, 215b, and finally out of the evaporative cooler 2 via damper 219c and duct 238.

The warm and humid primary air when passing through the bed of heat absorbing material 15a is sensibly cooled by the cool heat absorbing material of bed 15a which was cooled during the preceded desorption period by the secondary air 20 adiabatically cooled in bed 15b.

Simultaneously, as the primary air 21 passing through bed 15a is being cooled, the heat absorbing material in bed 15a is being heated. With respect to the perfectly countercurrent flow of the two air streams through the bed, the primary air 21 when passing through the bed of the heat absorbing material 15a is cooled down very close to the temperature of the previously adiabatically cooled secondary air 20. Because of the large surface area and heat storage capacity of bed 15a, and because of the perfectly countercurrent flow of the two air streams, sensible heat transfer effectiveness as high as 95% in bed 15a is economically feasible.

When the sensibly cooled primary air 21 passes through the bed of desiccant 15c cooled by the cooling water in coil 40, the primary air is dehumidified and cooled to the point when its relative humidity equals the relative humidity of the outdoor air 20, and its temperature has increased slightly above the temperature of the cooling water in coil 40.

When passing through the bed of the heat absorbing material 215a, the dehumidified and warm primary air 21 is sensibly cooled by the heat absorbing material which was cooled during the preceded desorption period by the adiabatically cooled secondary air 22 cooled in bed 215b.

Because of the perfectly countercurrent flow of the two air streams through bed 215a the dehumidified primary air is cooled in bed 215a very close to the temperature of the previously adiabatically cooled secondary air 22. Finally, when the dehumidified and sensibly cooled primary air 21 is forced through the wet bed 215b it is washed, humidified and adiabatically cooled to a low temperature at which the primary air is discharged from the evaporative cooler 2 via opening 236 and damper 219c.

When the processor 4 reverses the rotation of the electric motor of the air fan 3 in the middle of the operating cycle, then during the desorption period:

In dehumidifier:

The secondary air 20 is drawn by the 4-way air fan 3 from outdoors through screen 18a, duct 33, damper 19a, chamber 24, orifice 16, beds 15c, 15b, damper 19b, bed 15a and finally out of container 10 via opening 34 and screen 18b. The water pump 27 continuously pumps water from the water container 26 via line 31 into the water distribution channel 32 for wetting or spraying of the mattrix material in bed 15b. The water flowing downwardly through the matrix material is drained back into the water container 26 via drain pipe 35.

When passing through the bed of desiccant 15c the warm secondary air removes the moisture from the desiccant while in turn it is cooled by exchanging its sensible heat energy for the sesible heat of the coil 40 and the latent heat energy of the removed moisture. Under normal weather conditions, the difference in enthalpies of the warm outdoor-secondary air 20 and the sensibly cooled outdoor-primary air 21 is sufficient to achieve the required dehumidification of the primary air and reactivation of the spent desiccant without the need for use of an additional source of useful energy for reactivation of the spent desiccant. Under conditions of exceptionally high relative humidity and low temperature of the outdoor air, the needed energy for reactivation of spent desiccant is conveniently provided by the auxiliary heater 5 operating during the later part of the desorption period.

The partially adiabatically cooled secondary air 20 when passing through the wet bed 15b is washed, humidified and adiabatically cooled close to its wet bulb temperature. When passing through the bed 15a which bed was heated during the preceded sorption period, the secondary air 20 is heated up by absorbing the sensible heat released from the heat absorbing material and coil 38 while the heat absorbing material and coil 38 is being cooled down close to the temperature of the adiabatically cooled secondary air 20. The heated secondary air 20 is then discharged from the dehumidifier via opening 34 and screen 18b to outdoors.

In the evaporative cooler:

The secondary air 22 is drawn by the 4-way air fan 3 from outdoors through screen 218b, duct 235, damper 219b into container 200 of the evaporative cooler 2, then through beds 215b, 215a, orifice 216, then it is forced by air fan propeller 237 into chamber 224 and out of the evaporative coller 2 via duct 233, damper 219a and screen 218a. The water pump 227 continuously pumps water from the water container 226 via line 231 into the water distribution channel 232 for wetting or spraying of the matrix material in bed 215b. The water flowing downwardly through the matrix material is then drained back into the water container 226 via drain pipe 235.

When the secondary air 22 passes through the wet matrix in bed 215b, it is washed, humidified and adiabatically cooled close to its wet bulb temperature. When the adiabatically cooled secondary air 22 passes through the sensible heat absorbing material of bed 215a, a layer of the heat absorbing material at the entrance of bed 215a is cooled close to the temperature of the adiabatically cooled secondary air 22. As the secondary air 22 passes through the bed, its temperature gradually rises with the temperature of the bed material close to the temperature of the dehumidified primary air 21 at which temperature the secondary air 22 is finally discharged by the 4-way air fan 3 via damper 219a to outdoors.

If it is desired, a continuous stream of cool fresh air can be conveniently provided by two such described units of the embodiment of FIG. 1 controlled by a single processor 4, with the processor reversing the rotation of the two air fans in the middle of the operating cycle.

The described embodiment offers the least expensive apparatus permitting an ultra high energy efficient periodic flow type dehumidification and cooling of air during hot weather conditions without the need for additional source of useful energy for reactivation of the spent desiccant, and permitting high energy efficient dehumidification and cooling of air during periods of low temperature and high relative humidity of the outdoor air by using a low grade heat in an auxiliary heater offering significant reduction in consumption of fuel and power in cooling and ventilation of buildings.

The secondary air 22 may be an outdoor air or preferably the air exhausted from the building, in which case the apparatus of Fig. 1 will provide simultaneously balanced ventilation of the building.

It can be appreciated, that the dehumidifier of the apparatus of FIG. 1 can be conveniently separated from the evaporative cooler and used independently as an ultra high energy efficient dehumidifier in applications where cooling of the dehumidified air is not needed. Similarly, the evaporative cooler can be effectively used as indirect-direct evaporative cooler.

While the apparatus of the embodiment of FIG. 1 has been described with the two containers housing the matrix materials as being generally of a rectangular shape, it can be appreciated, that the shape of the matrix containers can be made also cylindrical.

Example 1 demonstrates the performance characteristics of the apparatus of FIG. 1 in an application when the produced cold air is used for ventilation and cooling of an air conditioned space.

Figure 2:
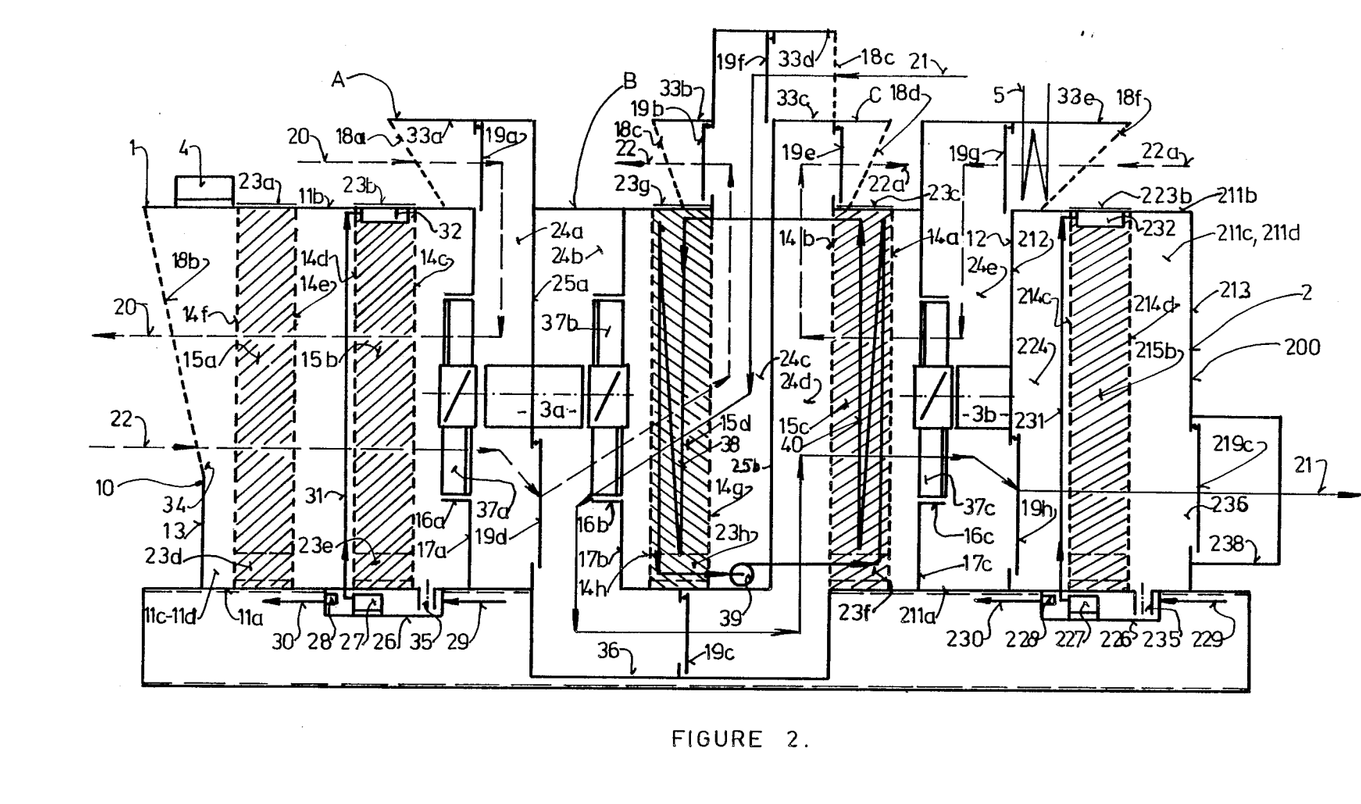
FIG. 2 is a schematic of another preferred embodiment of the apparatus of the present invention for dehumidification and cooling of air.

FIG. 2 shows another preferred embodiment of the apparatus of the present invention intended for air conditioning of a building.

As schematically illustrated in FIG. 2 the invented apparatus includes a dehumidifier 1, a direct evaporative cooler 2, a 4-way axial type air fan 3a, a 2-way axial type air fan 3b, and a solid state processor 4.

The dehumidifier 1 differs from that of the embodiment of FIG. 1 in the following features:

The matrix container 10 has partitions 25a, 25b that separate the container into first A, second B and third C sections, with section A being an indirect-direct evaporative cooler, section B a matrix type heat exchanger, and section C a desiccant dryer. Partition 17a with the air fan orifice 16a and partition 25a with side walls 11a–11d form chamber 24a provided for intake of first secondary air 20 and discharge of a second secondary air 22 from the air fan orifice 16a. Partition 17b with air fan orifice 16b and partition 25a with side walls 11a–11d form chamber 24b, partition 25b with screens 14b and 14g chambers 24c and 24d, and partition 17c with orifice 16c and front wall 12 chamber 24e.

The gravity back draft damper 19d in partition 25a is provided for discharge of the second secondary air 22 from chamber 24a into chamber 24b.

Additional screens 14g, 14h are provided for retaining an additional heat absorbing matrix 15d with heat absorbing solids as described for bed 15a in the apparatus of FIG. 1, and additional flanged openings 23g, 23h for replacement of the matrix material in bed 15d.

Section A of container 10 includes matrix beds 15a, 15b, section B bed 15d, and section C bed 15c with the bypass duct 36 interconnecting section B with section C.

The wet bed 15b is provided for adiabatic cooling of the first secondary air 20 and the second secondary air 22 passing through beds 15a, 15b, orifice 16a, chamber 24a, damper 19d, chamber 24b, orifice 16b, bed 15d, chamber 24c, damper 19b and via screen 18c to outdoors.

Matrix bed 15d in addition may also include a coil type heat exchanger 38 including a water pump 39.

Matrix bed 15c in addition may also include a coil type heat exchanger 40 interconnected with heat exchanger 38 with pump 39 recirculating during the sorption period cooling water between coils 38, 40 for cooling of the desiccant.

The bypass duct 36 with back draft damper 19c is provided for passage of the primary air 21 under the influence of the propeller 37b from chamber 24b of section B into chamber 24d of section C. The air fan propeller 37b alternately draws the primary air 21 into intake duct 33d, then via damper 19f into and through chamber 24c, then through bed 15d, orifice 16b into chamber 24b, then it is forced by propeller 37b into and through duct 36, damper 19c into chamber 24d of section C then it is drawn by propeller 37e through bed 15c, orifice 16c, then it is forced by propeller 37c through chamber 24e and via damper 19h into chamber 224 of the evaporative cooler 2.

The auxiliary heater 5 is located in the intake duct 33e and is provided for heating of a third secondary air 22a.

The additional 2-way air fan 3b includes orifice 16c with propeller 37c driven by a direct drive plug reversing electric motor permitting instant reversing of the rotation of the propeller 37c and thus instant switching of the flow of the primary and secondary air streams 21, 22a through section C and the evaporative cooler 2.

The 4-way tube axial air fan 3a and the 2-way tube axial air fan 3b provide the required alternate, periodic and countercurrent flow of the three secondary air streams 20, 22, 22a and the primary air 21 through the dehumidifier 1 and the evaporative cooler 2.

The evaporative cooler 2 of the embodiment of FIG. 2 includes only the wet bed 215b of the embodiment of FIG. 1 with the dehumidified primary air 21 being forced through bed 215b and out via damper 219c by the 2-way air fan 3b.

The simultaneous, alternate and periodic operation of the 4-way and 2-way air fans 3a, 3b is maintained by the processor 4.

The operation of the apparatus of FIG. 2 is similar as that of FIG. 1 with the following differences:

During the sorption period:

The primary air 21 is drawn by propeller 37b of the air fan 3a from the intake duct 33d through damper 19f, chamber 24c of section B, bed 15d, orifice 16b into chamber 24b, then it is forced by propeller 37b via duct 36, damper 19c into chamber 24d, then it is drawn by propeller 37c through bed 15c, orifice 16c, then it is forced by propeller 37c through chamber 24e, damper 19h, evaporative cooler 2 and out of the apparatus via damper 219c.

The primary air 21 is sensibly cooled in bed 15d, which bed was cooled during the preceded desorption period by the second secondary air 22 first cooled sensibly in bed 15a and then adiabatically in bed 15b. Thus the cooling effect of bed 15d is equivalent to a two stage cooling effect.

When the sensibly cooled primary air 21 passes through the bed of desiccant 15c cooled by the cooling water in coil 40, the primary air 21 is simultaneously dehumidified and cooled with the final moisture being significantly lower than that achieved in the apparatus of FIG. 1, and with its temperature being close to the temperature of the cooling water circulating through coils 38, 40.

The cool and dehumidified primary air 21 is cooled adiabatically in the wet bed of the evaporative cooler 2.

The cooling water circulated through coils 38, 40 is cooled in bed 15d simultaneously with the primary air 21 by the cold matrix material.

Simultaneously, as the primary air 21 passes through sections B, C of dehumidifier 1 and evaporative cooler 2, the first secondary air 20 is being drawn by propeller 37a from outdoors through screen 18a, duct 33a, damper 19a, chamber 24a and orifice 16a of section A, then it is forced by propeller 37a through beds 15b, 15a and then out of section A of dehumidifier 1 via screen 18b.

During the desorption period:

The second secondary air 22 is drawn by the propeller 37a from outdoors through screen 18b, opening 34 into section A of the dehumidifier 1, then through beds 15a, 15b, orifice 16a, then it is forced by propeller 37a through chamber 24a and drawn by propeller 37b through damper 19d into chamber 24b of section B, then through orifice 16b, then it is forced by propeller 37b through bed 15d, chamber 24c and out of section B via damper 19b to outdoors.

The secondary air 22 is sensibly cooled in bed 15a and adiabatically cooled in bed 15b before cooling the bed of the heat absorbing material 15d, i.e. it provides a two stage cooling effect for cooling the bed 15d used for precooling of the primary air 21 during the sorption period. The secondary air 22 is discharged from section B via damper 19b at a temperature that is close to the temperature of the incoming primary air entering bed 15d.

During the desorption period the water pump 39 is off and the cooling coil including the cooling water function as additional heat absorbing material of bed 15d.

Simultaneously, with the second secondary air 22 passing through sections A and B of dehumidifier 1 and with the water pump 39 being off, a third secondary air 22a which is used for reactivation of spent desiccant is drawn from outdoors by propeller 37c through screen 18f, damper 19g, chamber 24e, orifice 16c, then forced by propeller 37c through bed of desiccant 15c, chamber 24d, and out of section C via damper 19e to outdoors.

The reactivation of the spent desiccant with the third secondary air 22a is same as that described under the embodyment of FIG. 1.

Since in the apparatus of the present invention the dehumidification and reactivation effects are increasing with the increasing difference between temperatures and relative humidities of the precooled primary air 21 and the secondary-outdoor air 22a used in reactivation of the spent desiccant, the effectiveness of the embodyment of FIG. 2 is significantly higher than that of FIG. 1.

During the desorption period there is no flow of the secondary air through the evaporative cooler 2 of the embodiment of FIG. 2.

The apparatus of FIG. 2 also produces a periodic flow of cool primary air 21 and similarly as in the embodiment of FIG. 1 if it is desired, a continuous stream of cool fresh primary air can be provided by two dehumidifiers 1 of FIG. 2 combined with a single evaporative cooler 2.

In the described embodiment of FIG. 2 the primary air 21 may be either the recirculated building,s air or the outdoor make up air.

If a balanced ventilation of the building is desired, the exhausted air may be drawn with the first or with the second secondary air streams 20, 22, and the make up air with the primary air 21.

By adding an air to liquid heat exchanger to the evaporative cooler 2 discharge duct 217 the described apparatus may be used to produce chilled water for use in water cooling applications.

While the apparatus of FIG, 2 is more complex than that of FIG. 1, it provides more effective and more energy efficient dehumidification and cooling of the primary air than that provided by the apparatus of FIG. 1 which is evident from the performance data presented in Examples 1 and 2.

While the apparatus of FIG. 2 has been described with a coil type heat exchangers 38, 40, it can be appreciated that the dehumidifier can be also provided without the heat exchangers 38, 40, and that it can be also combined with an indirect-direct evaporative cooler of the embodiment of FIG. 1.

It can be also appreciated that the dehumidifier of the apparatus of FIG. 2 can be also conveniently separated from the evaporative cooler 2 and used independently as an ultra high energy efficient dehumidifier.

In addition, the two stage indirect evaporative cooler represented by sections A and B of the dehumidifier of FIG. 2 can be separated from section C and used independently as an ultra high energy efficient two stage indirect evaporative air cooler and or water cooler.

While the apparatus of FIG. 2 has been described with containers of a rectangular shape, it can be appreciated, that the shape of the matrix containers can be made also cylindrical.

As evident from the described embodiments and Examples 1,2, the apparatus and the method of the present invention produces cold fresh air without using the vapour compression or absorption refrigeration steps and with energy efficiency ratios (EER) that are substantially higher than those of the prior art systems.

Since the apparatus of the present invention is simple, the cost of used matrix materials is minimal, the life of the matrix materials is substantially infinite, the used heat and mass transfer surfaces are large and the heat and mass transfer effectiveness is superior, and the ducting with the quick closing valving is eliminated, both the capital and the operating costs of the invented apparatus for cooling and ventilation of buildings are expected to be substantially lower than that of the prior art.

The invented apparatus can be applied to a number of different uses in ventilation and air conditioning of residential, comercial and industrial buildings, as well as in numerous industrial processes requiring cool or dehumidified air for processing and or cooling, as an ultra high energy efficient two stage indirect evaporative cooler, dehumidifier, and or a dehumidifier-cooler.

EXAMPLES

The following are calculated data based on thermodynamic analysis of the cooling process of the invented apparatus supported by material and energy balances and thermodynamic properties of moist air assuming effectiveness of the involved heat and mass transfer operations at 95%.

EXAMPLE 1

Determine performance characteristic of the cooling apparatus of FIG. 1 with the produced cold fresh air being used for ventilation and cooling of an air conditioned space assuming: Location: Phoenix, Ariz.; Outside air design conditions:Dry bulb temperature 105° F., Wet bulb temperature 71° F.; Return air conditions: Dry bulb temperature 80° F., wet bulb temperature 66° F.; Regenerant air is outdoor air; a granular silica gel is used as desiccant.

The selected data are summarized in Table 1.

EXAMPLE 2

Determine the performance characteristics of the cooling apparatus of FIG. 2 assuming the same design conditions as given in Example 1.

The selected data are summarized in Table 2.

TABLE 1

| Quality of primary air after individual treatment steps: | | | | |
|---|---|---|---|---|
| Parameter: | Units | Primary outdoor air | Indirect cooling | Dehumidification | Direct ev. cooling |
| Dry bulb temperature | °F. | 105 | 74.5 | 75 | 50 |
| Wet bulb temperature | °F. | 71 | 61 | 51 | 49 |
| Humidity | lbH20/ lb d.a. | .0087 | .0087 | .003 | .007 |
| Enthalpy | BTU/ lb d.a. | 35.0 | 27.0 | 21.0 | 19.5 |

Heat removed from outdoor air: 15.5 BTU/lb.d.a.
Heat removed from occupied space: 11.3 BTU/lb.d.a.
Moisture removed from occupied space: .0038 lb/lb.d.a
EER for cooling of outdoor air: 179
EER for cooling of occupied space: 131
EER conventional vapour compression system: 8–11

TABLE 2

| Quality of primary air after individual treatment steps: | | | | |
|---|---|---|---|---|
| Parameter: | Units | Primary outdoor air | Indirect cooling | Dehumidification | Direct ev. cooling |
| Dry bulb temperature | °F. | 105 | 64.0 | 65,6 | 47.0 |
| Wet bulb temperature | °F. | 71 | 57.0 | 46.0 | 46.0 |
| Humidity | lbH20/ lb.d.a. | .0087 | .0087 | .0020 | .0065 |
| Enthalpy | BTU/ | 35.0 | 24.5 | 18.0 | 18.0 |

TABLE 2-continued

Quality of primary air after individual treatment steps:

| Parameter: | Units | Primary outdoor air | Indirect cooling | Dehumidification | Direct ev. cooling |
|---|---|---|---|---|---|
| | lb.d.a. | | | | |

Heat removed from outdoor air: 17.0 BTU/lb.d.a.
Heat removed from occupied space: 12.8 BTU/lb.d.a.
Moisture removed from occupied space: .004 lb H$_2$O/lb.d.a.
EER for cooling outdoor air: 197
EER for cooling of occupied space: 148
EER conventional vapour compression system: 8–11

SUMMARY OF THE DISCLOSURE

In summary of this disclosure, the present invention provides a compact ultra high energy efficient two stage indirect evaporative cooler, a dehumidifier, and a desiccant-cooler for use in air conditioning and ventilation of buildings and in industrial process dehumidification and cooling operations.

The apparatus is simple, compact, highly reliable, operates at atmospheric pressures substantially maintenance free with minimum flow resistances and increased effectiveness.

The invented ultra high energy efficient two stage indirect evaporative cooler integrates a periodic flow type sensible heat transferring heat exchangers with a periodic flow type humidifier to achieve a substantially increased effectiveness of the involved sensible and adiabatic cooling of the treated air in a single matrix container.

The invented ultra high energy efficient dehumidifier integrates the invented one stage or two stage periodic flow type indirect evaporative cooler with a periodic flow type desiccant dryer to provide dehumidified air and to permit reactivation of the spent desiccant by the outdoor air without the need for an additional source of useful energy.

The invented ultra high energy efficient desiccant cooler integrates the invented dehumidifiers with an evaporative cooler to provide cool and dehumidified air for use in air conditioning of buildings.

While the present invention has been described with reference to specific embodiments, and in specific applications to demonstrate the features and advantages of the invented apparatus, such specific embodiments are susceptible to modifications to fit other configurations or other applications. Accordingly, the forgoing description is not to be construed in a limiting sense.

What is claimed is:

1. Apparatus and a method for ultra high energy efficient dehumidification and cooling of air including:
   matrix container means for retaining matrix means and having intake-exit means including damper means for intake and exit of primary and secondary air streams, and having flanged openings for replacement of said matrix means, said matrix container means operating in a cycle including a sorption and a desorption periods,
   matrix means including first matrix, second matrix and third matrix, said first matrix including means for removing particulates and for absorbing and releasing sensible heat, said second matrix including means for adiabatic cooling of said primary and secondary air streams, and said third matrix including desiccant means for removing moisture from said primary air stream, with said primary air stream passing through said matrix means during said sorption period and first being sensibly cooled in said first matrix, then adiabatically cooled in said second matrix and then dehumidified in said third matrix and then discharged from said container means, and with said third matrix being reactivated by said first secondary air stream passing through said matrix means during said desorption period, with said first secondary air stream being adiabatically cooled in said third matrix and second matrix and then sensibly heated in said first matrix while cooling said first matrix during said desorption period,
   air fan means for passing said primary and secondary air streams alternately and countercurrently to each other through said matrix container means during said sorption and desorption periods and
   process control means for controlling said operating cycle and for maintaining a continuous operation of said apparatus.

2. Apparatus of claim 1 including in addition direct evaporative cooling means for additional cooling of said cooled and dehumidified primary air streams.

3. Apparatus of claim 1 including in addition indirect cooling means for additional cooling of said cooled and dehumidified primary air stream.

4. Apparatus of claim 1 including in addition indirect-direct evaporative cooling means for additional cooling of said cooled and dehumidified primary air stream.

5. Apparatus of claim 1 with said container means including partition means with damper means and by-pass duct means for separating said matrix container means into first and second chamber means including said matrix means and permitting passage of said primary air stream first through said first chamber means and said first matrix therein, then through said bypass duct means into said second chamber means and through said third matrix therein during said sorption period, with said primary air stream first being sensibly cooled in said first matrix and then dehumidified in said third matrix, and permitting passage of said first secondary air stream during said desorption period first through said second chamber means and through said third matrix and then second matrix therein, then through said partition and damper means into and through said first chamber means and said first matrix therein.

6. Apparatus of claim 1 with said matrix means including a fourth matrix including means for removing particulates and for absorbing and releasing heat, with said container means including partition means with damper means, bypass duct means and intake-exit means for intake and exit of a second and a third secondary air streams and for separating said matrix container means into first, second and third chamber means and for permitting passage of said primary air stream through said second chamber means and said fourth matrix therein, then through said bypass duct means into said third chamber means and through said third matrix therein and permitting passage of said second secondary air stream into and through said first chamber means and through said second and first matrix therein during said sorption period, and permitting passage of said first secondary air stream into and through said third chamber means and through said third matrix therein and passage of said third secondary air stream into and through said first chamber means and through said first and second matrix therein then through said partition and damper means into said second chamber means and through said fourth matrix therein during said desorption period, with said primary air stream first being sensibly cooled in said fourth matrix and then dehumidified in said third matrix and with said second secondary air stream being adiabatically cooled in said second matrix and then heated while cooling during said sorption period, and with said third matrix said first matrix being reactivated by said first secondary air stream and with said third secondary air stream first being sensibly cooled in said first matrix, then adiabatically cooled in said second matrix and then heated while cooling said fourth matrix during said desorption period.

7. Apparatus of claims 1, 5, and 6 including coil means for cooling said third matrix during said sorption period.

8. Apparatus of claims 1, 5, and 6 including coil means for heating said third matrix during said desorption period.

9. Apparatus of claims 1, 5, and 6 including coil means and pump means for cooling a liquid in said first matrix during said desorption period and circulating said liquid and cooling said third matrix during said sorption period.

10. Apparatus of claim 6 including coil means and pump means for cooling a liquid in said fourth matrix during said desorption period and circulating said liquid and cooling said third matrix during said sorption period.

11. Apparatus of claim 7 including pump means for circulating cooling water from said second matrix through said coil means and cooling said third matrix during said sorption period.

12. Apparatus of claim 7 including pump means for circulating cooling water from said second matrix through said coil means and cooling said third matrix and said dehumidified primary air stream during said sorption period.

13. Apparatus of claims 1, 5, and 6 including heater means for heating said first secondary air stream during said desorption period.

14. Apparatus of claims 7, 9, and 10 including heater means for heating said first secondary air streams during said desorption period.

15. Apparatus of claims 11 and 12 including heater means for heating said first secondary air stream during said desorption period.

16. Apparatus of claims 1, 5, and 6 including air to liquid heat exchanger means for cooling a liquid for use in cooling applications.

17. Apparatus of claims 7, 8, and 9 including air to liquid heat exchanger means for cooling a liquid for use in cooling applications.

18. Apparatus of claims 10, 11, and 12 including air to liquid heat exchanger means for cooling a liquid for use in cooling applications.

19. Apparatus of claims 13, 14 and 15 including air to liquid heat exchanger means for cooling a liquid for use in cooling applications.

* * * * *